3,458,401
PROCESS FOR THE FERMENTATIVE PRODUC-
TION OF D-RIBOSE PHOSPHATES
Yoshiaki Kawamori, Masahiko Matsuura, Takeshi Saito, and Yoshinobu Miyamura, Shizuoka-ken, Japan, assignors to Kyowa Hakko Kogyo Co., Ltd., Chiyoda-ku, Tokyo, Japan, a corporation of Japan
No Drawing. Filed July 19, 1965, Ser. No. 473,219
Claims priority, application Japan, July 30, 1964, 39/42,860
Int. Cl. C12b 3/00; C12d 13/02
U.S. Cl. 195—31                                    7 Claims

ABSTRACT OF THE DISCLOSURE

The present disclosure is directed to a method of preparing D-ribose phosphate which comprises culturing a D-ribose phosphate-producing microorganism in an aqueous culture medium containing nutrients for said microorganism, controlling the manganese content of the medium to less than 100 γ/l., whereby an enhanced yield of D-ribose phosphate accumulates, and recovering said accumulated D-ribose phosphate. The present process is not specific to any particular microorganisms or strains and is, in fact, applicable to strains of microorganisms belonging to, for example, the genera of Brevibacterium, Micrococcus, Aerobacter, Corynebacterium, Bacillus, etc.

---

The present invention relates to a process for the production of ribose phosphates, such as 5-phospho-D-ribosyl-1-pyrophosphate, D-ribose-1,5-diphosphate and D-ribose-5-phosphate, which are hereinafter referred to as PRPP, PRP and R-5-P respectively, by a fermentation procedure, i.e. by the culturing of microorganisms in apropriate culture media.

The invention is primarily characterized in that the culture of the microorganisms is carried out in media containing manganese in an extremely low concentration (less than 100 γ/liter, as manganese), whereby a remarkably large amount of D-ribose phosphates is produced.

The present inventors have previously embodied a fermentation method for the production of D-ribose phosphates by culturing microorganisms in a culture medium containing phosphates and magnesium salts in a comparatively high concentration. However, depending upon the composition of the culture medium employed, the presence of phosphates and magnesium salts in relatively high concentration in the culture medium does not always suffice to an accumulation of remarkable amounts of D-ribose phosphates. This defect of the prior procedure is obviated by the present invention according to which such accumulation of D-ribose phosphates requires a culture medium containing manganese in an extremely low concentration as one of the indispensible conditions.

These three D-ribose phosphates are useful for biochemical reagents and nucleotide producing materials.

It is known that manganese is essential to normal metabolism and growth of microorganisms. However, in conventional culture media, manganese is generally employed in a concentration of more than 100 γ/liter.

According to the present invention, a remarkable amount of D-ribose phosphates is accumulated in the culture liquid and in the cells of the cultured microorganisms by limiting the amount of manganese to a fractional quantity of the amount required for normal growth of the microorganisms and the cells of the cultured microorganisms. Restriction of the amounts of other indispensible elements than manganese to a low concentration also results in depression of the normal growth of the microorganisms, as in the case of manganese, but in no case other than low concentration of manganese can there be observed such an accumulation phenomenon as takes place with the latter.

It is evident from the foregoing that the accumulation of a remarkable amount of D-ribose phosphates, according to the present invention, is a characteristic phenomenon due to controlled deficiency of manganese.

The present invention is based on this finding and is characterized in that the content of manganese in the culture medium is deliberately restricted to less than 100 γ/liter by suitably selecting the raw materials and the mashing water, or by removing excess manganese from the culture medium or the raw materials used to constitute the same or the mashing water by appropriate and per se conventional means.

Tables 1 and 2, infra, show the relation which exists between the manganese concentration in the culture medium and the accumulation of D-ribose phosphates in the fermentation liquor. (Note.—the abbreviation "mg./ml." signifies milligrams per milliliter.)

TABLE 1

| Content of manganese in culture medium (as manganese) (γ/liter) | Content of dried bacterium (mg./ml.) | D-Ribose phosphates (as R-5-P), (mg./ml.) |
|---|---|---|
| 12 | 11 | 12.5 |
| 22 | 16 | 15.4 |
| 37 | 22 | 12.0 |
| 62 | 31 | 5.5 |
| 112 | 43 | 1.0 |
| 212 | 51 | 0.2 |
| 512 | 60 | 0.0 |

Brevibacterium ammoniagenes KY–3454 was employed as the seed. The composition of culture medium and the culture method are the same as in the case of Example 1. Manganese was added in the form of MnSO$_4$·4H$_2$O.

TABLE 2

| Content of manganese in culture medium (as manganese) γ/liter | Content of dried microorganism (mg./ml.) | D-Ribose phosphates (as R-5-P), (mg./ml.) |
|---|---|---|
| 10 | 8 | 6.2 |
| 20 | 14 | 9.5 |
| 35 | 21 | 10.0 |
| 60 | 35 | 6.0 |
| 110 | 45 | 2.0 |
| 210 | 51 | 0.5 |
| 510 | 55 | 0.2 |

As the seed, Micrococcus glutamicus ATCC 14995 was employed, and the composition of the culture medium and the culture method were the same as in Example 4. Manganese was added in the form of MnSO$_4$·4H$_2$O.

Table 3 shows the results of measurements of the manganese contents in various kinds of fermentation media and the accumulation amounts of D-ribose phosphates when 0.8% MgSO$_4$·7H$_2$O, 0.8% KH$_2$PO$_4$ and 0.8% K$_2$HPO$_4$ were added to those ferementation media.

TABLE 3

| Kind of culture medium | Content of manganese in medium (as manganese) (γ/liter) | D-Ribose phosphates (as R-5-P) |
|---|---|---|
| Culture medium for glutamic acid fermentation. | 2,500<br>1,500 | 0<br>0 |
| Culture medium for lysine fermentation | { 3,000<br>{ 2,500 | 0<br>0 |
| Culture medium for gluconic acid fermentation. | 1,000<br>1,200 | 0<br>0 |
| Culture medium for valine fermentation | { 3,000<br>{ 2,000 | 0<br>0 |
| Culture medium for xanthosine fermentation. | 500<br>1,000 | Trace.<br>Do. |
| Culture medium for mitomycin fermentation. | 2,000<br>1,300 | Do.<br>Do. |
| Culture medium for yeast fermentation | { 5,000<br>{ 2,500 | Do.<br>Do |
| Culture medium for 2-ketoglutaric acid fermentation. | 80<br>200 | 1.0<br>Trace. |

As the seed, Brevibacterium ammoniagenes KY–3454

(ATCC 6872) was used, and the same culture method as in Example 1 was adopted. Of course the nutrient-requiring materials of this bacterium were added to the culture medium.

It has been found according to the present invention that the finding upon which the latter is based is not specific to any particular microorganisms or strains, and the invention is in fact applicable to strains of microorganisms belonging to the genera of Brevibacterium, Micrococcus, Aerobacter, Corynebacterium, Bacillus, and so forth, as will hereinafter appear. Accordingly, the invention cannot be restricted to any particular microorganisms or to strains of any specific bacteriological classification. The invention is also applicable to nutrient-requiring mutants obtained by various mutation-inductive treatments.

The culture medium for use according to the invention can be any one which contains suitable amounts of saccharides and other carbon sources (e.g. glucose, starch, starch hydrolyzates, and molasses), nitrogen sources (e.g. urea, ammonium chloride, and ammonium nitrate), inorganic compounds (e.g. potassium phosphate, magnesium sulfate, manganese sulfate, zinc sulfate, iron sulfate, iron chloride, zinc chloride, and calcium chloride), and nitrogen-containing natural materials (e.g. corn steep liquor, yeast extract, meat extract, peptone, protein hydrolyzates, and fish meal). In the case of nutrient-requiring mutant strains, the necessary nutrient materials must be added, of course, to the media for the growth of these mutants.

Although the compositions of the culture media employed in this invention are thus otherwise the same as those used for general fermentations, it is necessary to adjust the manganese content to a low concentration, i.e. less than 100 γ/liter in the medium. This purpose is satisfied by appropriate selection and/or treatment of the raw materials of the culture medium and the mashing water.

Manganese is an element which exists universally and is present in the mashing water and the raw materials constituting the culture media. As aforeindicated, it is necessary to the realization of the purposes of this invention that the manganese content in the culture media be maintained at a concentration of less than 100 γ/liter. To realize this indispensible reduced concentration of manganese, the raw materials of the culture media and the mashing water are treated in per se known manner with ion exchange resins, chelating agents, precipitants, filtering agents and the like.

The fermentation according to this invention is carried out aerobically, for example with a shaking or aerating device, at a culture temperature of 20° to 40° C. After a culturing period of 2 to 7 days, strikingly large amount of PRPP, PRP and R-5-P are accumulated in the culture liquor and in the cells of the cultured microorganisms.

Upon completion of the fermentation, the PRPP, PRP and R-5-P can be recovered individually or as R-5-P from the culture liquors and the cells of the cultured microorganisms with the aid, for example, of ion exchange resins, etc., as described in greater detail in the following non-limitative examples of presently-preferred illustrative embodiments. In these examples, percentages are by weight.

Example 1

*Brevibacterium ammoniagenes* KY-3454 (ATCC 6872) as the seed was incubated in 300 milliliters of an aqueous culture medium containing 2% of glucose, 1% of peptone, 1% of meat extract, 0.25% of NaCl, and 0.2% of urea in a 2-liter conical flask, sterilized, and maintained at a pH value of 7.5 at 80° C. for 24 hours. The resulting culture was inoculated into the fermentation medium infra, in the ratio of 10% by volume relative to the latter. Forty milliliters of the fermentation medium was placed in a 500-milliliter Sakaguchi's flask and used after sterilization. The fermentation was carried out at 80° C. according to shaking culture. The composition of the fermentation medium was as indicated below. Each of the raw materials was carefully selected and the mashing water was passed through a column of ion exchange resin (Diaion SK No. 1, H type) (polystyrene quaternary ammonium type strongly acidic cation exchange resin) to remove manganese. The content of maganese in the medium was 20 γ/liter.

Composition of culture medium:

| | Percent |
|---|---|
| Glucose | 12 |
| Urea | 0.6 |
| $KH_2PO_4$ | 1.2 |
| $K_2HPO_4$ | 1.2 |
| $MgSO_4 \cdot 7H_2O$ | 0.6 |
| $CaCl_2 \cdot 2H_2O$ | 0.01 |
| $FeSO_4 \cdot 7H_2O$ | 0.002 |
| Yeast Extract | 0.2 |

Biotin, 30 γ/liter.

In this way, in the fermentation liquor cultured for 72 hours, PRPP, PRP and R-5-P were accumulated in an amount of 16.2 mg./ml., calculated as R-5-P. On the other hand when city water was used directly, the content of manganese in the medium was 38 γ/liter and the accumulation amount of PRPP, PRP and R-5-P was 10.3 mg./ml., calculated as R-5-P.

To 100 milliliters of the filtrate obtained by removing the bacteria from the former fermentation liquor, calcium hydroxide was added and the deposited inorganic phosphorus compounds were removed by centrifugation. The resulting supernatant liquid was passed through a column of Dowex-1 (formic acid type), the ribose phosphates being adsorbed and then eluted with 0.2 molar-, 0.4 molar- and, finally, 0.5 molar-sodium formate buffer solutions (pH 5.0), in order. Each fraction of R-5-P, PRP, and PRPP was passed through a Diaion SK No. 1 (H type) column, neutralized to pH 7.0 and then concentrated under reduced pressure.

The concentrate was treated with a small amount of carbon powder, and the pH was adjusted to 8.3 with sodium hydroxide. To the thus treated concentrate, barium acetate (20%) in an amount 1.2 times the calculated amount and alcohol (four-fold volume) were added to precipitate the barium salts.

The precipitates were dried under reduced pressure to acord R-5-P, PRP and PRPP in the yields of 320 milligrams, 430 milligrams, and 3.3 grams, respectively, calculated as the respective anhydrous barium salts.

Dowex-1 (formic acid type) is a strongly basic anion exchange resin.

Example 2

The fermentation was carried out in the same manner as in Example 1, except that water treated by an air lift system high-speed sedimentation apparatus was used as the mashing water (using aluminum sulfate and calcium oxide as a flocculating agent), to accumulate PRPP, PRP, and R-5-P in a yield of 14.8 mg./ml., as R-5-P.

In this case the content of manganese in the culture medium was 23 γ/liter. On the other hand, when untreated water was employed, the manganese content in the culture medium was 42 γ/liter and the yield of PRPP, PRP and R-5-P was 9.8 mg./ml., calculated as R-5-P.

Example 3

By using acid-saccharized starch liquor passed through a column of Diaion SK No. 1 (H type) (strongly acidic cation exchange resin), the fermentation was carried out in the same way as in Example 1 resulting in an accumulation of PRPP, PRP, and R-5-P in a yield of 13.8 mg./ml., as R-5-P. In this case the content of manganese in the culture medium was 28 γ/liter. On the other hand, when untreated acid-saccharized starch liquor was employed, the content of manganese was 118 γ/liter and the yield of PRPP, PRP, and R-5-P was 0.9 mg./ml., as R-5-P.

Example 4

Seed cultivation was performed in the same way as in Example 1, using *Micrococcus glutamicus* ATCC 14995 as the seed, and the resulting culture was inoculated into the fermentation medium in a ratio of 10% by volume relative to the latter. The fermentation medium of the following composition was utilized:

| | Percent |
|---|---|
| Glucose | 12 |
| $(NH_4)_2HPO_4$ | 0.4 |
| $NaHPO_4$ | 1.0 |
| Peptone | 0.2 |
| $FeSO_4 \cdot 7H_2O$ | 0.002 |
| $KH_2PO_4$ | 1.0 |
| $MgSO_4 \cdot 7H_2O$ | 1.2 |
| $CaCl_2$ | 0.01 |

Biotin, 3.0 γ/liter.
pH #8.0 (before treatment with the hot steam).

As the mashing water, the water treated by ion exchange resins was used and the content of manganese in the culture medium was 25 γ/liter. The fermentation was carried out by use of 3 liters of the culture medium, which was sterilized in a 5-liter jar fermentor, according to submerged culture under aeration-agitation.

During the course of culture, the pH of the medium was adjusted to 7.0. After the cultivation at 34° C. for 48 hours, PRPP, PRP, and R-5-P were accumulated in the fermentation liquor in an amount of 11.0 mg./ml., calculated at R-5-P.

In addition, the accumulation of these compounds was observed also in the cells of the cultured microorganism.

From 2 liters of the fermentation liquor, R-5-P, PRP, and PRPP were fractionated according to the same procedure as in Example 1 and obtained in yields of 1.0 gram, 8.5 grams, and 45.0 grams, respectively, calculated as the respective anhydrous barium salts.

Example 5

*Brevibacterium ammoniagenes* KY-3454 (ATCC 6872) was used as the seed, and the same medium composition as in Example 1 was employed. The total amount of manganese was controlled so as not to exceed 50 γ/liter by selecting carefully the raw materials of the culture medium and by utilizing water treated with ion exchange resin as the mashing water. Seed culture was performed by use of 100 liters of the culture medium in a 200-liter fermentation tank at 30° C. for 16 hours according to submerged culture under aeration-agitation and the resulting culture was subjected to final culture (medium 1,000 liters/2,000 liters fermentation tank). The fermentation liquor was adjusted to pH 4.0 with hydrochloric acid, heated at 60° C. for 30 minutes and then filtered. The filtrate was neutralized and calcium hydroxide was added thereto, and the resulting inorganic phosphorus compounds were removed by centrifugative filtration. The obtained filtrate was passed through a column of Diaion SA No. 100 (Cl type) (polystyrene sulfonic acid type strongly basic anion exchange resin), R-5-P being adsorbed. (In this case, PRP and PRPP were both decomposed into R-5-P by the heat treatment.) Then, elution with 1-normal NaOH was conducted and the R-5-P fraction was neutralized to pH 6.6 by use of a column of Diaion SK No. 1 (H type), followed by concentrating under reduced pressure.

To the concentrate, which was decolorized by addition of carbon powder and the pH of which was adjusted to 8.0 with sodium hydroxide, the calculated amount of 30% barium acetate and alcohol (4-fold the volume) were added, depositing the barium salt of R-5-P. The drying of the precipitate under reduced pressure gave 28 kilograms of the barium salt of R-5-P having 5½ moles of water of crystallization.

Example 6

When, by using the following fermentation medium, various kinds of microorganisms were cultured under the same conditions as in Example 1 for 72 hours, 96 hours, and 6 days in the cases of bacteria, yeasts and actinomyces, and molds, respectively, the accumulations of ribose phosphates were as shown in Table 4.

| | Composition of fermentation medium, percent | | | |
|---|---|---|---|---|
| | Bacteria | Yeasts | Actinomyces | Molds |
| Glucose | 10 | 10 | 10 | 10 |
| Urea | 0.4 | | | |
| $NH_4Cl$ | 0.2 | 0.5 | 0.5 | 0.5 |
| $K_2HPO_4$ | 1.0 | 1.0 | 1.0 | 1.0 |
| $H_3PO_4$ | 1.0 | 1.0 | 1.0 | 1.0 |
| $MgSO_4' 7H_2O$ | 0.6 | 0.6 | 0.6 | 0.6 |
| Yeast extract | 0.4 | 0.4 | 0.4 | 0.4 |
| Peptone | 0.2 | 0.2 | 0.2 | 0.2 |
| $FeSO_4 \cdot 7H_2O$ | 0.002 | 0.002 | 0.002 | 0.002 |
| $ZnSO_4 \cdot 7H_2O$ | 0.0005 | 0.0005 | 0.0005 | 0.0005 |
| $CaCl_2 \cdot 2H_2O$ | 0.01 | 0.01 | 0.01 | 0.01 |
| pH before sterilization | 7.3 | 6.3 | 7.3 | 5.3 |

Manganese salts were not added to the culture medium B and the concentration of manganese in the medium was 20 γ/liter, as manganese. On the other hand, to the medium A was added $MnSO_4 \cdot 4H_2O$ of 500 γ/liter, as manganese.

In the following table the total amounts of ribose phosphates are represented as R-5-P.

TABLE 4

| Strain used | Culture medium A | Culture medium B (mg./ml.) |
|---|---|---|
| *Aerobacter aerogenes* ATCC 14304 | Trace | 7.4 |
| *Alcaligenes faecalis* 3101 | do | 6.0 |
| *Bacillus subtilis* ATCC 14618 | do | 7.1 |
| *Bacillus cereus* 3305 | do | 5.8 |
| *Corynebacterium tirtici* 3506 | do | 4.8 |
| *Flavobacterium arborescens* 3702 | do | 4.0 |
| *Leuconostoc citrovorum* 3551 | do | 4.0 |
| *Micrococcus citreus* 3752 | do | 5.0 |
| *Micrococcus caseolyticus* 3754 | do | 3.8 |
| *Pseudomonas fluorescens* 3594 | do | 6.0 |
| *Pseudomonas ovalis* 3750 | do | 7.5 |
| *Arthrobacter ureafaciens* 3152 | do | 5.8 |
| *Arthrobacter simplex* 3151 | do | 4.0 |
| *Escherichia coli* ATCC 14621 | do | 8.0 |
| *Brevibacterium ammoniagenes* ATCC 15137 | do | 9.0 |
| *Brevibacterium linens* 3457 | do | 6.8 |
| *Micrococcus glutamicus* ATCC 14305 | do | 7.0 |
| *Candida albicans* 5021 | do | 3.1 |
| *Candida mycoderma* 5024 | do | 2.8 |
| *Cryptoccocus neoformans* 5052 | do | 4.3 |
| Bacterium No. 3952 | do | 7.8 |
| *Cryptococcus alibidus* 5051 | do | 3.0 |
| *Hansenula anomala* 5151 | do | 4.0 |
| *Saccharomyces cerevisiae* 5451 | do | 3.9 |
| *Saccharomyces carlsbergensis* 5458 | do | 5.0 |
| *Torula candida* 5501 | do | 2.0 |
| *Torulaspora delbruecki* 5551 | do | 3.0 |
| *Willa anomala* 5592 | do | 3.0 |
| Yeast No. 5201 | do | 5.8 |
| *Streptomyces griseus* 122 | do | 4.0 |
| *Streptomyces fradiae* 163 | do | 3.1 |
| Streptomyces sp 539 | do | 4.0 |
| *Aspergillus japonicus* 21 | do | 5.0 |
| *Penicillium adamentzioides* 355 | do | 4.2 |
| *Mucor spinosus* 420 | do | 4.2 |
| *Trichoderma viride* 164 | do | 3.6 |
| Mold No. 1091 | do | 6.0 |

What is claimed is:
1. In a process for producing D-ribose phosphate by culturing a D-ribose phosphate-producing microorganism in an aqueous culture medium, the improvement which comprises treating the raw materials and mashing water which comprise the aqueous culture medium and which have a combined manganese content of greater than 100 γ/l. to reduce the manganese content of the aqueous culture medium to less than 100 γ/l., and inoculating the microorganism into said culture medium.

2. In a process for producing D-ribose phosphate by culturing a D-ribose phosphate-producing microorganism, the improvement which comprises treating the raw materials and mashing water for the aqueous culture medium with an ion exchange resin, a chelating agent, or a precipitant to reduce the manganese content of the aqueous culture medium to less than 100 γ/l., and inoculating the microorganism therein.

3. In a process for producing D-ribose by culturing a microorganism of the genus Brevibacterium in an aqueous culture medium containing nutrients for said microorganism, the improvement which comprises treating the raw materials and mashing water which comprise the aqueous culture medium and which have a combined manganese content of greater than 100 γ/l. to reduce the manganese content of the culture medium to less than 100 γ/l. and inoculating the microorganism into said culture medium.

4. The improvement as set forth in claim 3, wherein the microorganism is *Brevibacterium ammoniagenes*.

5. In a process for producing D-ribose by culturing a microorganism of the genus Micrococcus in an aqueous culture medium containing nutrients for said microorganism, the improvement which comprises treating the raw materials and mashing water which comprise the aqueous culture medium and which have a combined manganese content of greater than 100 γ/l. to reduce the manganese content of the culture medium to less than 100 γ/l. and inoculating the microorganism into said culture medium.

6. The improvement as set forth in claim 5, wherein the microorganism is *Micrococcus glutamicus*.

7. In a process for producing a mixture of 5-phospho-D-ribosyl-1-pyrophosphate, D-ribose-1,5-diphosphate and D-ribose-5-phosphate by culturing a D-ribose phosphate mixture-producing microorganism in an aqueous culture medium, the improvement which comprises treating the raw materials and mashing water which comprise the aqueous culture medium and which have a combined manganese content of greater than 100 γ/l. to reduce the manganese content of the aqueous medium to less than 100 γ/l. and inoculating the microorganism into said culture medium.

References Cited
UNITED STATES PATENTS
3,303,101　2/1967　Kinoshita et al. _____ 195—31

OTHER REFERENCES
Gunslaus et al., The Bacteria III, Academic Press, New York, pp. 296 and 297 (1962).

ALVIN E. TANENHOLTZ, Primary Examiner